US007782313B2

(12) United States Patent
Lin et al.

(10) Patent No.: US 7,782,313 B2
(45) Date of Patent: Aug. 24, 2010

(54) REDUCING POWER DURING IDLE STATE

(75) Inventors: Ruei-Ling Lin, Taipei (TW); Jiin Lai, Taipei (TW); Win Sheng-Cheng, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 564 days.

(21) Appl. No.: 11/554,787

(22) Filed: Oct. 31, 2006

(65) Prior Publication Data

US 2008/0100606 A1 May 1, 2008

(51) Int. Cl.
*G09G 5/36* (2006.01)
*G06F 1/00* (2006.01)

(52) U.S. Cl. ....................... 345/211; 345/545; 345/547; 713/323; 713/324

(58) Field of Classification Search ................. 345/545, 345/547, 210–212; 713/320, 322–324
See application file for complete search history.

(56) References Cited

U.S. PATENT DOCUMENTS

| | | | | |
|---|---|---|---|---|
| 5,757,365 | A * | 5/1998 | Ho | 345/212 |
| 5,864,336 | A * | 1/1999 | Yano | 713/321 |
| 6,040,845 | A * | 3/2000 | Melo et al. | 345/520 |
| 6,930,655 | B2 * | 8/2005 | Adler | 345/3.1 |
| 2002/0018029 | A1 * | 2/2002 | Koyama | 345/39 |
| 2004/0051687 | A1 * | 3/2004 | Weng | 345/87 |
| 2006/0132437 | A1 * | 6/2006 | Kim | 345/157 |

* cited by examiner

*Primary Examiner*—Amare Mengistu
*Assistant Examiner*—Robert R Rainey
(74) *Attorney, Agent, or Firm*—Thomas, Kayden, Horstemeyer & Risley, LLP

(57) ABSTRACT

Included are systems and methods for reducing power consumption in a computer system. At least one embodiment of a method, among others, includes processing data in a normal mode, receiving an indication of a transition into an idle mode, capturing at least one frame of display data, and transmitting the captured frame of display data for display during idle mode.

19 Claims, 7 Drawing Sheets

REDUCING POWER DURING IDLE STATE

CROSS REFERENCE

This application is related to U.S. patent application Ser. No. 11/554,769, entitled "Systems and Methods for Low-Power Computer Operation," filed on the same day as this application, which is hereby incorporated by reference in its entirety.

BACKGROUND

As computer systems have evolved, processing speeds, storage capacity, and overall functionality has improved. While many of the improvements are desirable, they often have a byproduct of increased power consumption. In many cases, a certain degree of power consumption may be expected, however, excessive power consumption can reduce battery life, reduce computer efficiency, as well as create other problems for the computer system.

In an effort to reduce power consumption in computer systems, many computer architects and designers have developed hardware and/or software that can operate in a power-saving mode. As a nonlimiting example, after a predetermined period of nonuse, many operating systems can be configured to inform a power management unit (PMU) to enter a power-saving mode. When the power-saving mode is entered, one or more components of the computer system are powered off (and/or taken to a state of reduced functionality.

While in some cases, the power saving mode can include shutting down a hard drive and/or shutting down other components, in many cases the display unit (e.g., a monitor) is still operational (e.g., the screen saver frame). In order to display the desired graphics, a graphics engine may be continuously transmitting the frame to the display unit such that the display unit displays (refreshes) the frame. Thus, despite the reduced graphic functionality during this time, the graphics engine may still be operating with full functionality, and thus still consuming power.

Thus, a heretofore unaddressed need exists in the industry to address the aforementioned deficiencies and inadequacies.

SUMMARY

Included is a method for reducing power consumption in a computer system. At least one embodiment of the method includes processing data in a normal mode and receiving an indication of a transition into an idle mode. Other embodiments of a method include capturing at least one frame of display data and transmitting the captured frame of display data for display during idle mode.

Also included is computer system for reducing power consumption during an idle state. At least one embodiment of the computer system includes a screen snapshot module configured to capture data related to a display frame and a screen memory module configured to store the captured display frame. Other embodiments of the method include a screen control module configured to, in response to the computer system entering an idle state, transmit the stored display frame to a display unit associated with the computer system.

Additionally included in this disclosure is computer readable medium for reducing power consumption in a computer system. At least one embodiment of the computer readable medium includes logic configured process data in a normal mode and logic configured to determine that computer system is entering an idle mode. Other embodiments of a computer readable medium include logic configured to capture a display frame and logic configured to transmit the captured display frame to a display unit.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Embodiments of this disclosure relate to a transmitter having a power-saving mode. In at least one embodiment, the transmitter may be coupled to a display unit and may be configured to transmit a frame for display by the display unit. The transmitter may include a screen snapshot module, a memory module, and a screen control module. The screen snapshot module, which may be coupled to the display unit, can be configured to snapshot the frame being displayed by the display unit when a computer system enters a power-saving mode. The memory module stores the frame that was "snapshotted" by the screen snapshot module. The screen control module can continuously transmit the frame stored in the memory module to the display unit when the computer system is in the power-saving mode.

The computer system may also include a graphics engine, a transmitter, and/or a display unit. The graphics engine can be configured to perform at least one graphic computation and can be configured to generate an image signal as a frame to be displayed. The transmitter, which can be coupled to the graphics engine, can receive the frame. The display unit, which can be coupled to the transmitter, displays the frame transmitted by the transmitter. When the computer system enters a power-saving mode, the transmitter snapshots the frame, which is being displayed by the display unit. The display unit can be configured to continuously display the snapshotted frame when the computer system is in the power-saving mode.

Figure 1:
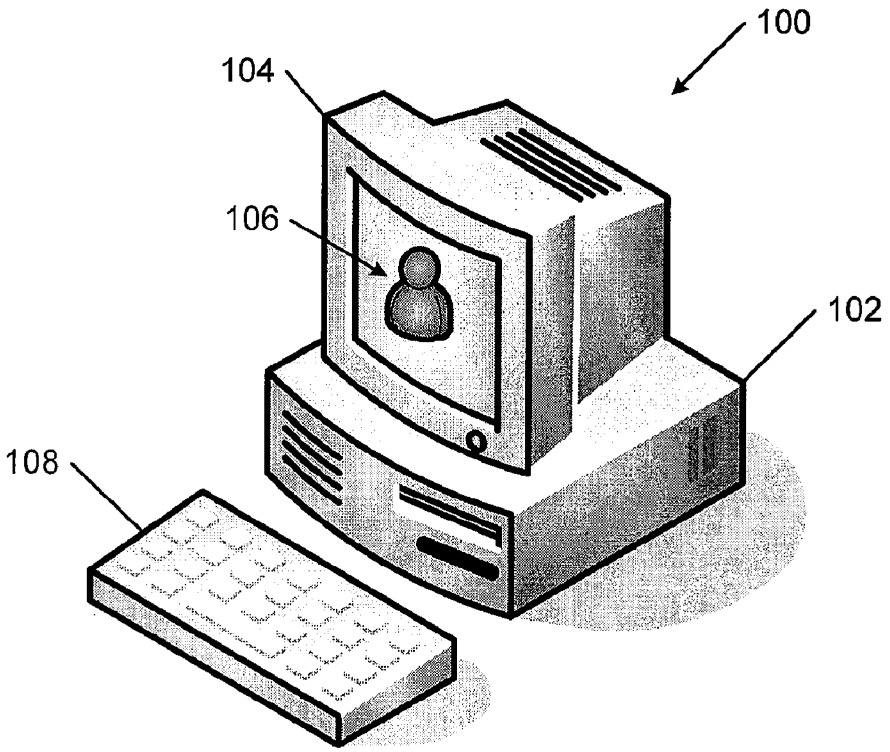
FIG. 1 is a diagram illustrating an embodiment of a computer system that may be configured for low-power graphics operation.

FIG. 1 is a schematic diagram illustrating an embodiment of a computer system that may be configured for low-power graphics operation. More specifically, computer system 100 can be a general purpose or special purpose digital computer 102, such as a personal computer (PC; IBM-compatible, Apple-compatible, or otherwise), laptop computer, work-station, mini-computer, personal digital assistant (PDA), wireless phone, or main-frame computer, for example. Display unit 104 may include, for example, a Liquid Crystal Display (LCD), a Cathode Ray Tube (CRT) display, and/or a projector (i.e. an LCD projector or a digital-light processor (DLP) based projector). Display unit 104 can be configured to receive a signal from computer 102 that corresponds to a frame or image 106 to be displayed on a view screen of display unit 104. The image 106 can be any visual information for display by system 100. Also included with computer system 100 are one or more peripheral devices 108, which can include a keyboard, mouse, external drive, and/or other device.

As a nonlimiting example, at a time when computer system 100 is not idle (e.g., in normal mode), a plurality of signals can be provided to display unit 104. These signals may correspond to the non-idle activity being performed by the computer system 102 (i.e. progress in processing a media file, playback of a multimedia file, etc.). However, at a time when the computer system is idle, image 106 can be a screen-saver image or a slide related to a presentation. Even though computer system 100 may be idle and the image 106 may not change, the signals to display image 106 may be continuously transmitted from computer system 102 to the display unit 104. In at least one embodiment, the computer system 100 can be configured to provide the signals to display unit 104 at a frequency corresponding to the refresh rate of display unit 104 (e.g. 60 Hz).

Figure 2:
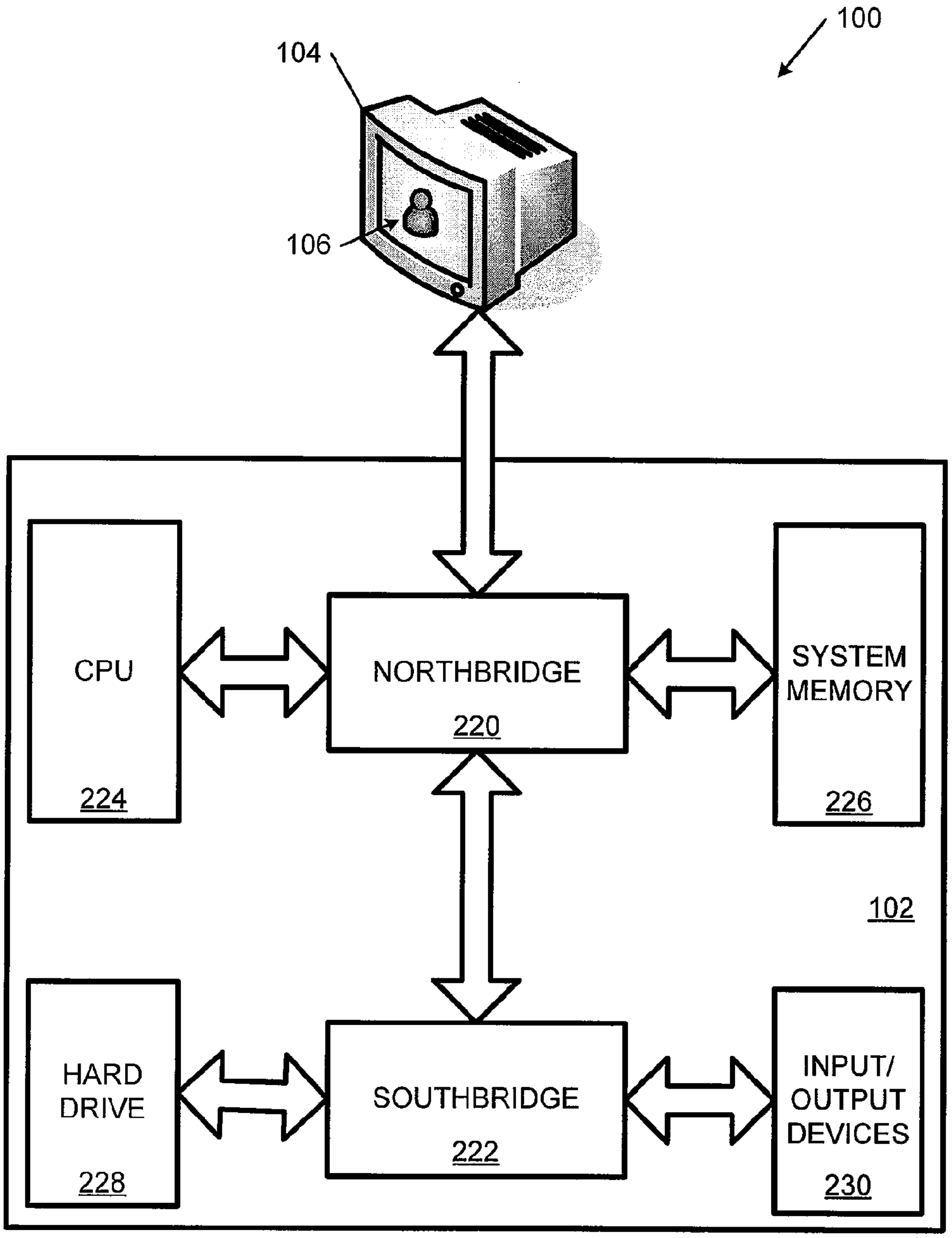
FIG. 2 is a diagram illustrating an embodiment of various components of a computing system, such as the computing system from FIG. 1.

FIG. 2 is a schematic diagram illustrating an embodiment of various components of a computing system, such as the computing system from FIG. 1. More specifically, computer 102 can include a northbridge 220 and a southbridge 222. Generally speaking, the northbridge 220 can be configured to connect various components associated with the computer 102. The northbridge 220 can be coupled to a CPU 224, a system memory 226, as well as the display device 104. The southbridge 222, which can also be coupled to the northbridge 220, may be coupled to the hard drive 228, and the input/output devices 230. Connecting the components to the northbridge 220 and southbridge 222 can be one or more communications pathways (e.g., busses), which are represented by arrows in FIG. 2.

One should note that although the client device of FIGS. 1 and 2 is illustrated as a personal computer, this discussion can be applied to any device that can be configured for providing the desired functionality. Examples include, but are not limited to a desktop computer, laptop computer, mobile telephone, BLACKBERRY®, PDA, IPOD®, TREO®, etc., as well as those described above.

One should also note that the CPU can be any custom made or commercially available processor, a graphics processing unit (GPU), an auxiliary processor among several processors associated with the client device 202, a semiconductor based microprocessor (in the form of a microchip or chip set), a macroprocessor, or generally any device for executing software instructions. Examples of suitable commercially available microprocessors are as follows: a PA-RISC series microprocessor from HEWLETT-PACKARD® Company, an 80x86 or PENTIUM® series microprocessor from INTEL® Corporation, a POWERPC® microprocessor from IBM®, a SPARC® microprocessor from SUN MICROSYSTEMS®, Inc, or a 68xxx series microprocessor from MOTOROLA® Corporation.

Additionally, the system memory component 226 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the system memory component 226 may incorporate electronic, magnetic, optical, and/or other types of storage media (one or more of which can be coupled to southbridge 222). Note that the system memory component 226 can have a distributed architecture, where various components are situated remote from one another, but can be accessed by the CPU 224 via northbridge 220 and/or southbridge 222. System memory component 226 can include an operating system, a web browser, a JavaScript engine 388, as well as any of a plurality of different software programs.

The operating system in system memory component 226 may include one or more separate programs, each of which includes an ordered listing of executable instructions for implementing logical functions. A nonexhaustive list of examples of suitable commercially available operating systems is as follows: (a) a WINDOWS® operating system available from MICROSOFT® Corporation; (b) a NETWARE® operating system available from NOVELL®, Inc.; (c) a MACINTOSH® operating system available from APPLE® Computer, Inc.; (d) a UNIX operating system, which is available for purchase from many vendors, such as the HEWLETT-PACKARD® Company, SUN MICROSYSTEMS®, Inc., and AT&T® Corporation; (e) a LINUX operating system, which is freeware that is readily available on the Internet 100; (f) a run time VXWORKS® operating system from WINDRIVER® Systems, Inc.; and/or (g) an appliance-based operating system, such as that implemented in handheld computers or personal data assistants (PDAs) (e.g., PALMOS® available from PALM® Computing, Inc., and WINDOWS CE® available from MICROSOFT® Corporation). The operating system can be configured to control the execution of other computer programs and provides scheduling, input-output control, file and data management, memory management, and communication control and related services.

A system component embodied as software may also be construed as a source program, executable program (object code), script, and/or any other entity comprising a set of instructions to be performed. When constructed as a source program, the program is translated via a compiler, assembler, interpreter, or the like, which may or may not be included within the system memory component 226, so as to operate properly in connection with the operating system.

The Input/Output devices that may be coupled to system southbridge 222 and may include, for example but not limited to, a keyboard, mouse, scanner, microphone, etc. Further, the Input/Output devices may also include output devices, for example but not limited to, a printer, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the computer system 100 is a personal computer, workstation, or the like, the software in the system memory component 226 may further include a basic input output system (BIOS) (omitted for simplicity). The BIOS is a set of software routines that initialize and test hardware at startup, start the operating system, and support the transfer of data among the hardware devices. The BIOS is stored in ROM so that the BIOS can be executed when the computer system 100 is activated.

When the computer system 100 is in operation, the CPU 224 may be configured to execute software stored within the system memory component 226, to communicate data to and from the system memory component 226 via northbridge 220, and to generally control operations of the computer system 100 pursuant to the software. Software in memory, in whole or in part, are read by the CPU 224, perhaps buffered within the CPU 224, and then executed.

Figure 3:
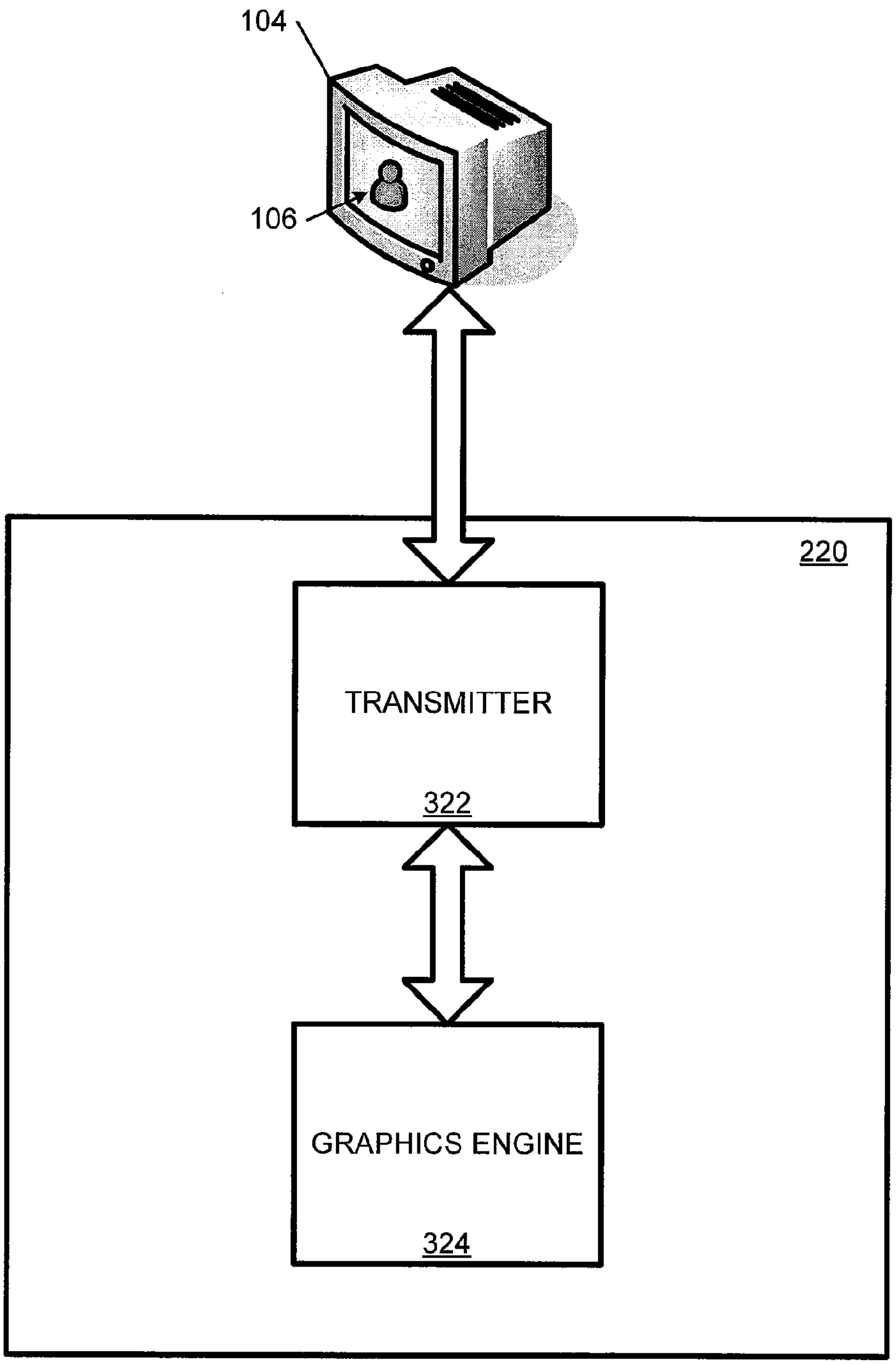
FIG. 3 is a diagram illustrating an embodiment of various components associated with a northbridge component, such as the northbridge component from FIG. 2.

FIG. 3 is a schematic diagram illustrating an embodiment of various components associated with a northbridge component, such as the northbridge component from FIG. 2. In at least one embodiment, the northbridge unit 220 includes a graphics engine 324 and a transmitter 322 and is electrically connected with the display unit 104. The graphics engine 324 can be configured to perform graphic computations to generate an image signal. Upon generation of the image signal, the graphics engine 324 can transmit the image signal to the display unit 104 through the transmitter 322 so as to drive the display unit 104 to display the image.

One should note that, in at least one embodiment (as depicted in FIG. 3), the graphics engine 324 and the transmitter 322 are integrated in the northbridge unit 220 such that the area occupied by the components can be reduced. However, one of ordinary skill in the art will understand that, in at least one embodiment, the graphics engine 324 may be independent of the northbridge unit 220. In addition, depending on the particular configuration, the transmitter 322 may also be independent of the northbridge unit 220.

Figure 4:
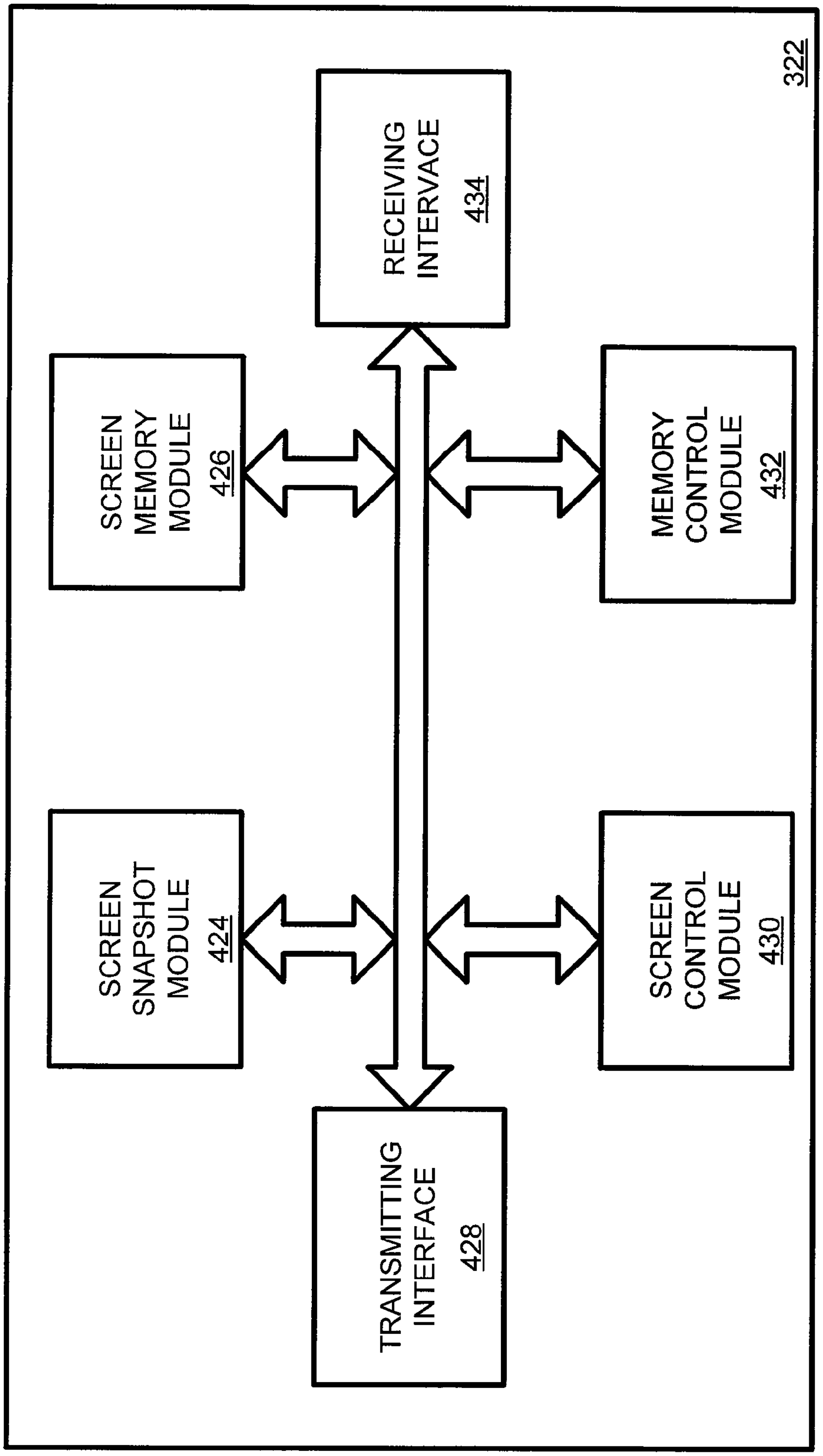
FIG. 4 is a diagram illustrating various components in a transmitter, such as the transmitter from FIG. 3.

FIG. 4 is a schematic diagram illustrating various components in a transmitter, such as the transmitter from FIG. 3. The transmitter 322 includes a screen snapshot module 424, a screen memory module 426, a screen control module 430 and a memory control module 432. In at least one embodiment, the memory control module 432 can be configured to control access of a frame stored in the screen memory module 430. In addition, the transmitter 322 may also include a receiving interface 434 and a transmitting interface 428.

In operation, the screen snapshot module 424 snapshots the frame being displayed by the display unit 104 when the computer system 100 enters a power-saving mode. The screen snapshot module 424 can then store the snapshotted frame in the screen memory module 426. In addition, the screen control module 424 can be configured to transmit (continuously, periodically, aperiodically, etc.) the frame stored in the screen memory module 426 to the display unit 104 through the transmitting interface 428 after the computer system 100 enters the power-saving mode.

One should also note that one or more of the receiving interface 434 and the transmitting interface 428 may include a digital video interface (DVI), a high definition multimedia interface (HDMI), a low voltage differential signaling (LVDS) interface, and/or a transition minimized differential signaling (TMDS) interface, depending on the particular embodiment.

Figure 5:
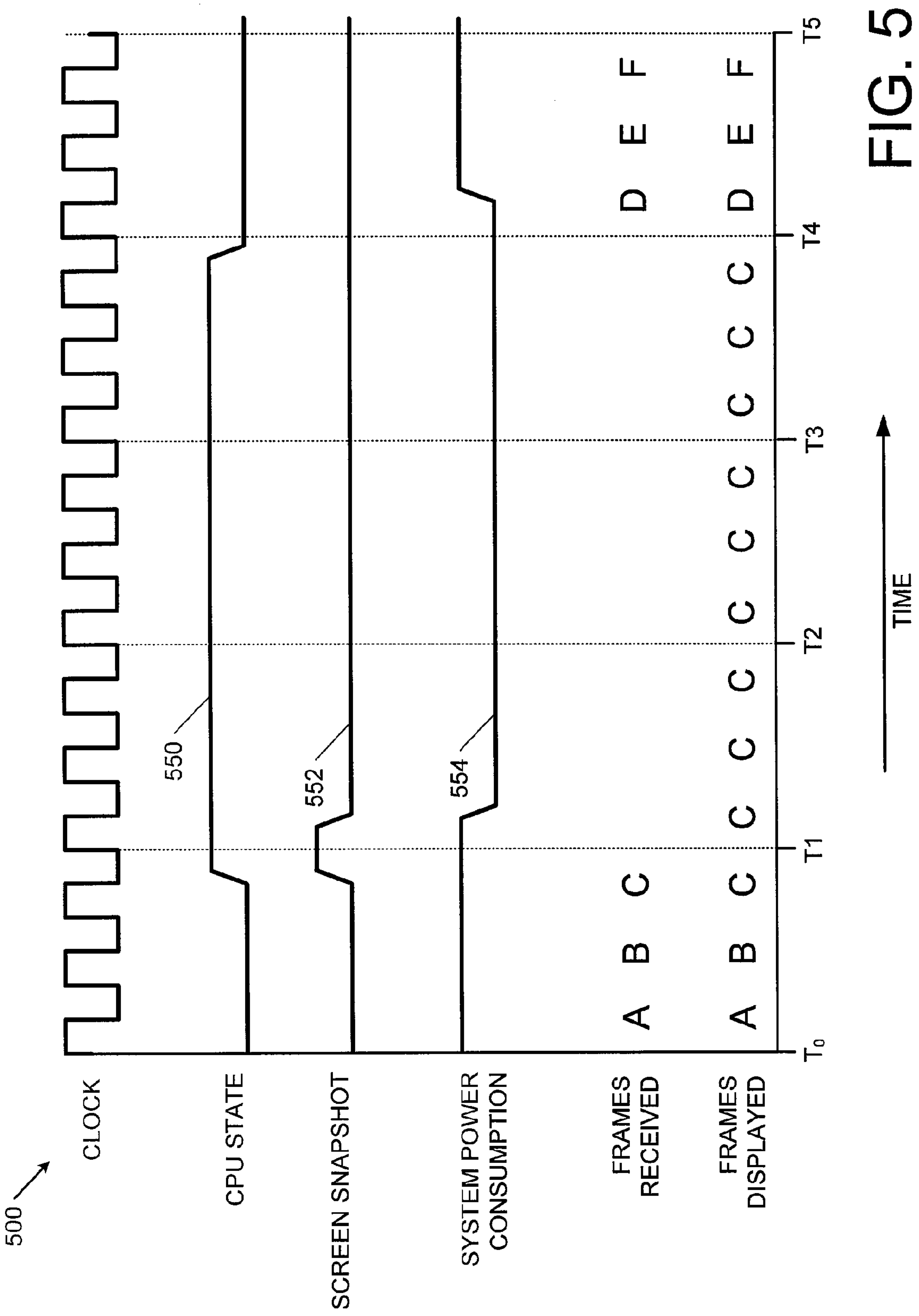
FIG. 5 is a timing diagram illustrating an embodiment of logical states of various components of a computer system, such as the computer system from FIG. 1.

FIG. 5 is a timing diagram illustrating an embodiment of logical states of various components of a computer system, such as the computer system from FIG. 1. More specifically, timing diagram 500 includes a clock signal illustrating an internal clock of computer system 100. Also included is waveform 550, which represents the idle state of CPU 224. More specifically, when the waveform 550 is low, the CPU is in normal mode and when the waveform 550 is high, the CPU is in idle mode. As illustrated in FIG. 5, the CPU can be operating in normal mode until a idle even occurs at T1. An idle event can include inactivity on the computer system 100 for a predetermined time, a user activating idle mode, and/or other events.

Upon the occurrence of an idle event, the CPU can shut down one or more components, and the screen snapshot module 424 can take a snapshot of the frame being displayed by the display unit 104, as illustrated in waveform 552. Upon taking the screen snapshot, the computer system can shut down graphics engine 324, system memory 226, and/or other components. Additionally, the captured image can be displayed via transmitter 322, as described above.

In addition, as displayed in FIG. 5, the frames received at transmitter 322 include frame "A," frame "B," and "frame "C." At time T1, in response to the computer system 100 entering idle mode, the screen snapshot module 424 can take a snapshot of the frame currently being displayed (frame "C"). After entering idle mode, the graphics engine 324 (and/or other components) may be disabled and, as such, transmitter 424 may not receive frames while in idle mode. While in idle mode, transmitter 424 can access frame "C" from screen memory module 426 and continuously transmit frame "C" to display unit 104 until an indication to return to normal mode is received.

Upon receiving an indication to return to normal mode (at time T4), normal processing can resume. More specifically, graphics engine 324 (as well as other components) can reactivate, thereby providing transmitter 424 with additional frames (e.g., frame "D," frame "E," and frame "F") for display on display unit 104.

Figure 6:
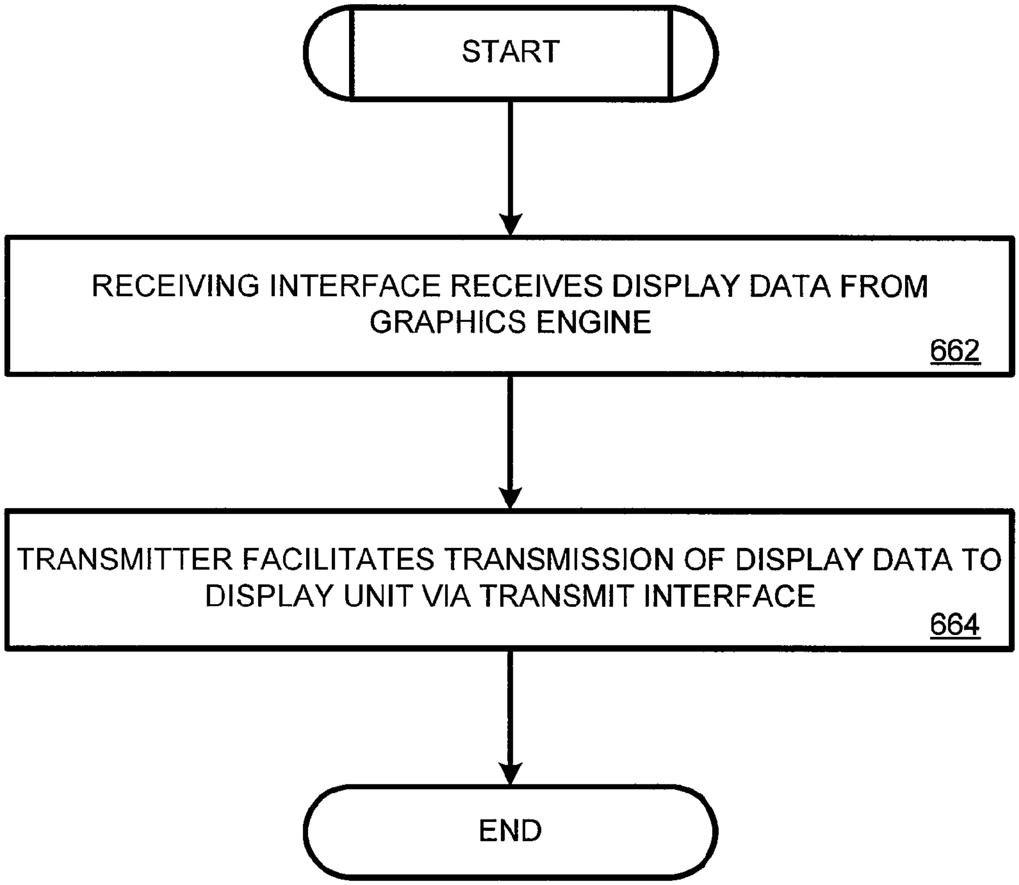
FIG. 6 is a flowchart illustrating an embodiment of steps that can be taken in a computer system that is operating in normal power mode, such as the computer system from FIG. 1.

FIG. 6 is a flowchart illustrating an embodiment of steps that can be taken in a computer system that is operating in normal power mode, such as the computer system from FIG. 1. The first step in this nonlimiting example if for receiving interface 434 of transmitter 322 to receive display data from graphics engine 324 (step 662). Upon receiving the display data at the receiving interface 434, the transmitter 322 can facilitate transmission of the display data to the display unit via transmit interface 428 (step 664).

As discussed above, during operation in normal mode, graphics unit 324 (as well as other components) may be fully operational to provide display data to display unit 104. While such a configuration may be beneficial for display purposes, when the computer system 100 enters idle mode, a reduction in power consumption may be desired.

Figure 7:
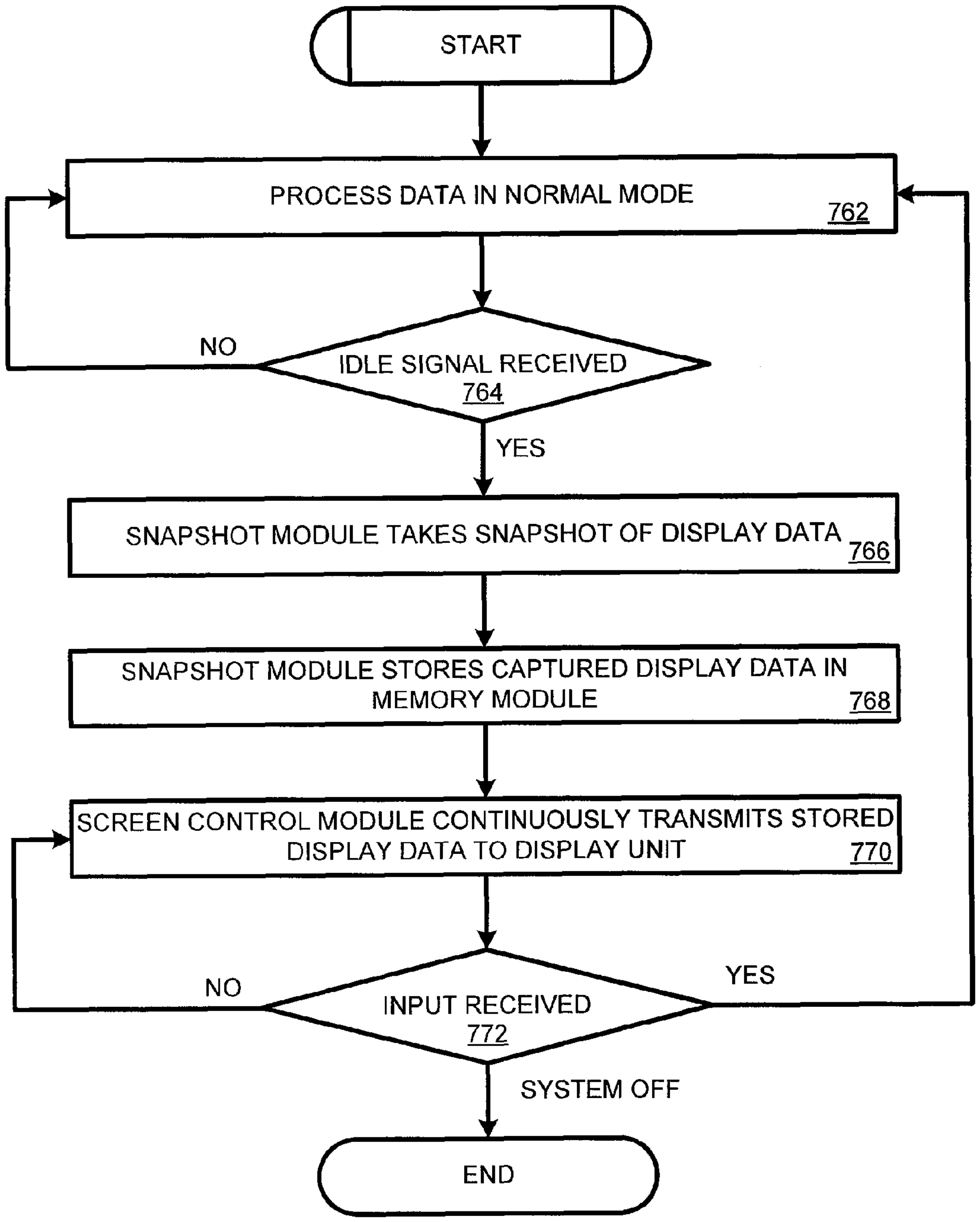
FIG. 7 is a flowchart illustrating an embodiment of steps that can be taken in a computer system that is operating in power-saving mode, similar to the flowchart from FIG. 6.

FIG. 7 is a flowchart illustrating an embodiment of steps that can be taken in a computer system that is operating in power-saving mode, similar to the flowchart from FIG. 6. The first step in this nonlimiting example is for the computer system 100 to process data in normal mode (step 762). As discussed above, the graphics engine 324 (and/or other components) may facilitate display of the graphics data on graphics unit 104. The computer system 100 can then determine whether an idle signal is received (step 764). If an idle signal is received (e.g., receiving no inputs over a predetermined amount of time), the snapshot module 424 can take a snapshot of the displayed data (step 766). The snapshot module 424 can then facilitate storage of the captured display data in screen memory module 426 (step 768). The screen control module 430 can then continuously transmit the stored display data to the display unit 104 (step 770). The computer system 100 can then determine whether an input is received (step 772) and/or other indication for normal mode to resume. If no such input is received, the flowchart returns to step 770 to continue transmitting the stored display data to the display unit 104. If, on the other hand, an input is received, the flowchart can return to step 762 and normal mode processing can resume. If at any time, the computer system 100 is shut down (as represented by the arrow from block 772 to end block), the process can end.

As discussed above, utilizing the transmitter for capturing, storing and communicating current display data to display unit 104, the computer system 100 can reduce power consumption by disabling various components, such as graphics engine 324, system memory 226, one or more system busses and/or other components. Additionally, because screen memory module 426 may be configured to store smaller amounts of data (e.g., one frame of display data), power consumption may be further reduced.

Additionally, after capturing the current frame data, the transmitter 322 may only have the task of refreshing the screen (e.g., continuously sending the saved display data to the display unit 104). When this occurs, the transmitter 322 may be configured to disable all unnecessary components. Such a scenario can provide further power savings due.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include, a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A computer system for reducing power consumption during an idle state, the computer system comprising:
- a screen snapshot module configured to capture data related to a display frame of a video signal, the video signal being displayed on a display unit associated with the computer system;
- a screen memory module configured to store the captured display frame;
- a screen control module configured to, in response to the computer system entering an idle state, transmit the stored display frame from the computer system to the display unit associated with the computer system;
- wherein at least the screen control module is integrated within a northbridge unit; and
- wherein the computer system is further configured to deactivate at least one of the following during the idle mode: the screen snapshot module and the screen memory module.

2. The computer system of claim 1, wherein the computer system is configured to display the transmitted display frame during idle state via the display unit.

3. The computer system of claim 1, further comprising a graphics engine configured to provide at least one frame for display, wherein the computer system is configured to deactivate the graphics engine during an idle state.

4. The computer system of claim 1, further comprising a system memory component, wherein the computer system is configured to deactivate the system memory component during an idle state.

5. The computer system of claim 1, further comprising a system bus, wherein the computer system is configured to deactivate the system bus during an idle state.

6. The computer system of claim 1, wherein the screen control module is configured to continuously transmit the stored display data to the display unit.

7. The computer system of claim 1, wherein at least one of the following is coupled to the northbridge unit: the screen capture module and the screen memory module.

8. A method for reducing power consumption in a computer system, the method comprising:
- processing display data in a normal mode, the display data corresponding to a video signal displayed on a display screen;
- receiving an indication of a transition into an idle mode;
- capturing at least one frame of the display data;
- deactivating a graphics engine associated with the computer system;
- transmitting the captured frame of the display data from the computer system to the display screen for display on the display screen during idle mode; and
- facilitating deactivation of at least one of the following during the idle mode: a screen snapshot module and a screen memory module.

9. The method of claim 8, further comprising storing the captured frame of the display data.

10. The method of claim 8, further comprising facilitating deactivation of a system memory component.

11. The method of claim 8, further comprising facilitating deactivation of a system bus.

12. The method of claim 8, wherein the captured frame is continuously transmitted for display during idle mode.

13. A non-transitory computer readable medium for reducing power consumption in a computer system, the computer readable medium comprising:

logic configured to process graphics data in a normal mode, the graphics data corresponding to a video signal displayed on a display unit;

logic configured to determine that computer system is entering an idle mode;

logic configured to capture a display frame from the graphics data;

logic configured to transmit the captured display frame from the computer system to the display unit; and logic configured to deactivate at least a portion of the logic configured to process graphics data in normal mode and facilitate deactivation of a graphics engine associated with the computer system.

14. The non-transitory computer readable medium of claim 13, wherein the logic configured to deactivate at least a portion of the logic configured to process graphics data in normal mode is configured to facilitate deactivation of a system memory component associated with the computer system.

15. The non-transitory computer readable medium of claim 13, wherein the logic configured to deactivate at least a portion of the logic configured to process graphics data in normal mode is configured to facilitate deactivation of a system bus associated with the computer system.

16. The non-transitory computer readable medium of claim 13, further comprising logic configured to store the captured display frame.

17. The non-transitory computer readable medium of claim 13, further comprising logic configured to facilitate deactivation at least one of the following during idle mode: the logic configured to determine that computer system is entering an idle mode and the logic configured to capture a display frame.

18. The non-transitory computer readable medium of claim 13, wherein the logic configured to transmit the captured display frame is further configured to transmit the captured display frame from a northbridge unit to the display unit.

19. The method of claim 8, wherein the transmitting step further comprises transmitting the captured frame of the display data from a northbridge unit of the computer system to the display screen for display on the display screen during idle mode.

* * * * *